US007151911B2

(12) United States Patent
Matsumoto

(10) Patent No.: US 7,151,911 B2
(45) Date of Patent: Dec. 19, 2006

(54) PORTABLE COMMUNICATION DEVICE

(75) Inventor: Mitsuyoshi Matsumoto, Tokyo (JP)

(73) Assignee: NEC Corporation, Tokyo (JP)

( * ) Notice: Subject to any disclaimer, the term of this patent is extended or adjusted under 35 U.S.C. 154(b) by 579 days.

(21) Appl. No.: 10/454,693

(22) Filed: Jun. 5, 2003

(65) Prior Publication Data
US 2003/0228847 A1 Dec. 11, 2003

(30) Foreign Application Priority Data
Jun. 11, 2002 (JP) ............................. 2002-169901

(51) Int. Cl.
*H04B 1/38* (2006.01)
(52) U.S. Cl. .................. 455/90.2; 455/575.8; 455/566; 455/575.1; 379/110.01; 379/433.11; 379/433.13; 348/552; 348/14.01; 348/135
(58) Field of Classification Search ............... 455/90.2, 455/575.8, 566, 575.1; 379/110.01, 428.01, 379/433.11, 433.13
See application file for complete search history.

(56) References Cited

U.S. PATENT DOCUMENTS

| 6,069,648 | A  | * | 5/2000 | Suso et al. ............... | 348/14.02 |
| 6,295,088 | B1 | * | 9/2001 | Tsukahara et al. ..... | 348/333.06 |
| 6,424,843 | B1 | * | 7/2002 | Reitmaa et al. ............. | 455/566 |
| 6,518,993 | B1 | * | 2/2003 | Kerai et al. ............... | 348/14.01 |
| 6,628,430 | B1 | * | 9/2003 | Silverbrook et al. ........ | 358/473 |
| 6,829,490 | B1 | * | 12/2004 | Nakamura et al. ....... | 455/550.1 |
| 6,879,337 | B1 | * | 4/2005 | Tatehana et al. ......... | 348/14.02 |
| 6,965,413 | B1 | * | 11/2005 | Wada ......................... | 348/376 |
| 6,996,424 | B1 | * | 2/2006 | Ijas et al. ................ | 455/575.1 |
| 2001/0004269 | A1 |  | 6/2001 | Shibata et al. | |

FOREIGN PATENT DOCUMENTS

| JP | 6-292195   | 10/1994 |
| JP | 2002-374434 | 12/2002 |
| JP | 2003-110895 | 4/2003 |

\* cited by examiner

*Primary Examiner*—Marceau Milord
(74) *Attorney, Agent, or Firm*—Dickstein Shapiro LLP

(57) ABSTRACT

A portable communication device which is improved in operationality for taking pictures of a landscape and the like by its camera, and ensures excellent portability. The portable communication device comprises: a main body which has an operation section including operation keys and buttons on its main surface; a cover which has a display section for showing information, and is foldably joined to the main body; and a camera having an objective lens. The cover includes a rotation supporting section which is supported for rotational movement relative to the main body on a first axis, and a display section which is supported for rotational movement relative to the rotation supporting section on a second axis running at right angles to the first axis. The rotation supporting section is provided with the objective lens in a position facing the operation section on the main body when the portable communication device is folded up.

72 Claims, 6 Drawing Sheets

PORTABLE COMMUNICATION DEVICE

FIELD OF THE INVENTION

The present invention relates to a portable communication device for carrying out a conversation and transmitting/receiving data and, more particularly, to a portable communication device provided with a camera for taking a picture of an object.

BACKGROUND OF THE INVENTION

Portable communication devices such as a cellular telephone and PDA (Personal Digital Assistant) have come into popular use. Due to the progress in multi-functionality, cellular telephones, for example, often have functions for transmitting/receiving text/image data, taking a picture and the like in addition to call functions. Such cellular telephone is provided with a display for displaying text/image data and pictures.

There is found an example of a conventional cellular telephone having a CCD (Charge Coupled Device) camera and an LCD (Liquid Crystal Display) for displaying pictures taken by the camera, etc. in Japanese Patent Application laid open No. HEI6-292195.

In the conventional cellular telephone, an objective lens of the camera is placed adjacent to the display in a plane common with the LCD. With this construction, a user can transmit pictures taken by the camera to his/her party as well as looking at images received from the party while carrying on a conversation. That is, the cellular telephone can be used as what is called a television telephone.

FIG. 1 is a diagram showing an oblique perspective view of the conventional cellular telephone. Referring to FIG. 1, the conventional cellular telephone comprises a main body 103, a cover 104, a display section 111 having an LCD, a camera section 112 for taking user's own pictures and an operation section 113 including several operation keys and buttons. The cover 104 is of approximately the same dimension as the main body 103. The cover 104 is joined to the main body 103 so as to be foldable like a bivalve shell by a rotation supporting mechanism that supports the cover 104 for rotational movement. In this construction, the operation section 113 is generally provided on the main body 103, while the display section 111 is provided on the cover 104 for the reason that a user holds the main body 103 when using the cellular telephone.

The main body 103 and the cover 104 each have an inner surface that is unexposed when the main body 103 and the cover 104 are folded. As can be seen in FIG. 1, the display section 111, the camera section 112 and the operation section 113 are arranged on the inner surfaces. The cellular telephone is folded up into a compact form while being carried around or unused. Consequently, it is possible to reliably prevent damage to the surface of the LCD and wrong operation of the operation keys, thus realizing excellent portability.

Incidentally, the cellular telephone having a camera as above is required to be available for taking pictures of various scenes and objects at places where a user has gone by taking advantage of its portability and, for example, transmitting moving pictures on camera in real time.

However there are some problems in the conventional cellular telephone. As can be seen in FIG. 1, the camera section 112 of the conventional cellular telephone is arranged adjacent to the display section 111 in a plane common with the LCD. Consequently, it is difficult for a user to check images on camera displayed in the LCD while taking pictures of objects other than user's own face such as a landscape since the objective lens of the camera section 112 has to be directed toward the objects. In addition, the user him/herself is sometimes captured in an image when checking the image on camera. Besides, there is a difficulty in bringing an object into focus swiftly and reliably.

That is, the camera section 112 of the conventional cellular telephone is intended mainly to take a picture of user's own face, and therefore quite inconvenient and operationally inefficient for taking pictures of objects other than user's own face.

In order to solve those problems, it has been proposed to place the camera on the side of the cover opposite the display, or provide another camera for taking pictures of other objects in addition to the camera for taking pictures of user's own face.

However, in the case where the camera is placed on the side of the cover opposite the display, the objective lens of the camera is exposed and unprotected when the cellular telephone is folded, and the objective lens is subject to damage. On the other hand, in the case where the cellular telephone is provided with plural cameras, the entire body of the cellular telephone is increased in size, thus reducing its portability.

SUMMARY OF THE INVENTION

It is therefore an object of the present invention to provide a portable communication device which is improved in operationality when taking pictures of a landscape, etc. by its camera and has a high level of portability.

In accordance with the present invention, to achieve the above object, there is provided a portable communication device comprising: a main body which has an operation section including operation keys and buttons on its main surface; a cover which has a display for showing information, and is joined to the main body so as to be foldable; and a camera having an objective lens. The cover includes a rotation supporting section which is supported for rotational movement relative to the main body on a first axis and a display section which is supported for rotational movement relative to the rotation supporting section on a second axis running at right angles to the first axis. Additionally, the rotation supporting section is provided with the objective lens in a position facing the operation section on the main body when the portable communication device is folded.

With this construction, the portable communication device of the present invention enables a user to check an image on camera using the display section while he/she is taking a picture by rotating the display section 180-degree relative to the rotation supporting section on the second axis. Thus, it is possible to improve the operationality of the portable communication device for taking a picture by the camera. Moreover, since the objective lens is arranged so as to face the operation section when the portable communication device is folded up, the lens is securely protected when folding the device. Besides, the portable communication device of the present invention allows a user to view images on camera and take pictures of his/her face as well as a landscape, etc. in good condition by only one camera. Consequently, it is possible to provide a small portable communication device with excellent portability at a low manufacturing cost. Furthermore, the portable communication device of the present invention can be folded with the display section in a position rotated 180-degree relative to the rotation supporting section on the second axis. Namely, the display section is outwardly visible even when the portable communication device is folded. Thus, a user can view the display section of the portable communication device that is folded up compactly, which ensures excellent portability even when using the display section.

Preferably, the portable communication device of the present invention further comprises a control means for switching a display shown in the display section from the first display state in which an image stored in a memory is displayed to the second display state in which an image being taken through the objective lens is displayed. With this construction, it is possible to improve the operationality of the entire portable communication device.

Preferably, the control means switches a display shown in the display section from the first display state to the second display state when the display section is rotated 180-degree relative to the rotation supporting section on the second axis. By this means, the operationality of the entire portable communication device is further improved.

Preferably, the operation section on the main body of the portable communication device of the present invention is provided with a switching operation button for switching the first display state to the second display state and vice versa. With this construction, the operationality of the entire portable communication device is further improved.

Preferably, the control means brings the display section in the first display state when the portable communication device is folded with the display section being outwardly visible. By this means, the operationality of the entire portable communication device is further improved.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENT

Figure 1:
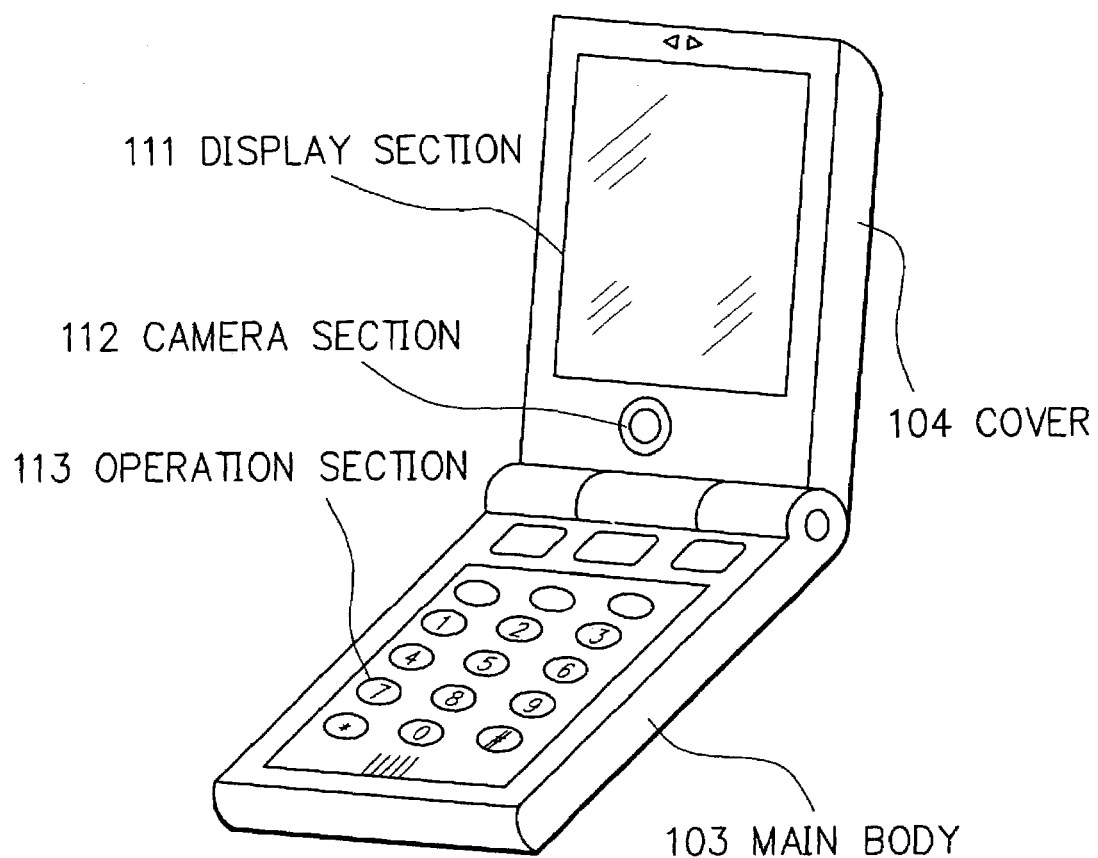
FIG. 1 is a diagram showing an oblique perspective view of a conventional cellular telephone.

Referring now to the drawings, a description of a preferred embodiment of the present invention will be given in detail.

Figure 2:
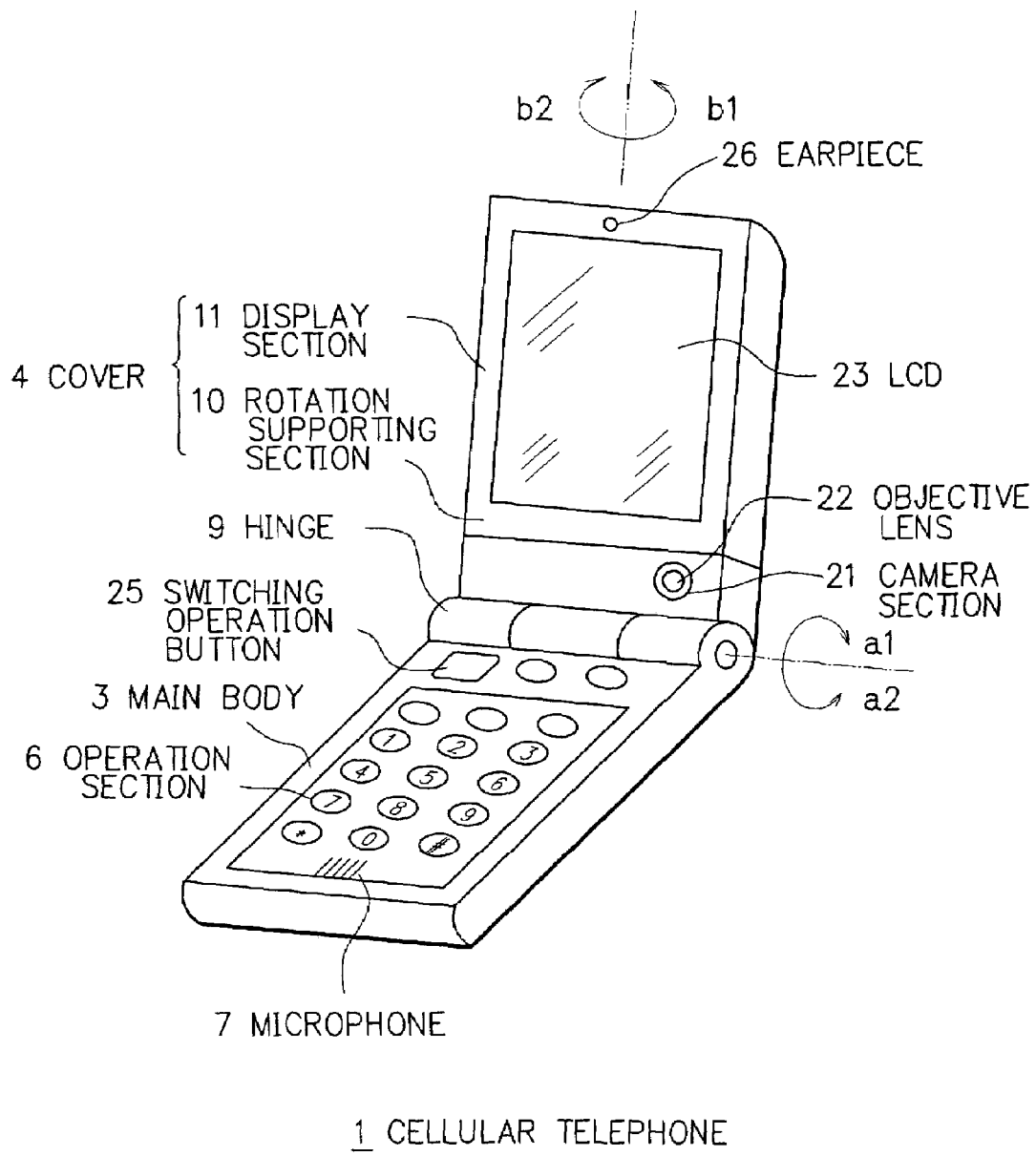
FIG. 2 is a diagram showing an oblique perspective view of a cellular telephone according to the present invention.

FIG. 2 is a diagram showing an oblique perspective view of a cellular telephone according to the present invention. As can be seen in FIG. 2, the cellular telephone 1 comprises a main body 3 and a cover 4 which is joined to the main body 3 so as to be foldable in the directions indicated by arrows $a_1$ and $a_2$. The main body 3 includes a control section (not shown) having a telephone communication circuit.

The main body 3 is provided with an operation section 6, a microphone 7 and a hinge 9. The operation section 6 is used for carrying out a range of operations, and arranged on the main surface of the main body 3, which faces into the cover 4 when the cellular telephone is folded. The operation section 6 includes operation keys and buttons each having electrical interconnection with the control section. The microphone 7 is also arranged on the main surface and electrically connected to the control section. The hinge 9 supports the cover 4 for rotational movement in the directions indicated by arrows $a_1$ and $a_2$.

Incidentally, the main body 3 further includes a battery chamber (not shown) where a secondary cell is detachably inserted and a battery chamber cap (not shown) for the battery chamber, which can be opened and closed.

The cover 4 includes a rotation supporting section 10 and a display section 11. The rotation supporting section 10 is supported from the main body 3 for rotational movement in the directions indicated by arrows $a_1$ and $a_2$. The display section 11 is supported by the rotation supporting section 10 so as to be rotatable in the directions indicated by arrows $b_1$ and $b_2$, and displays a variety of information.

Figure 3:
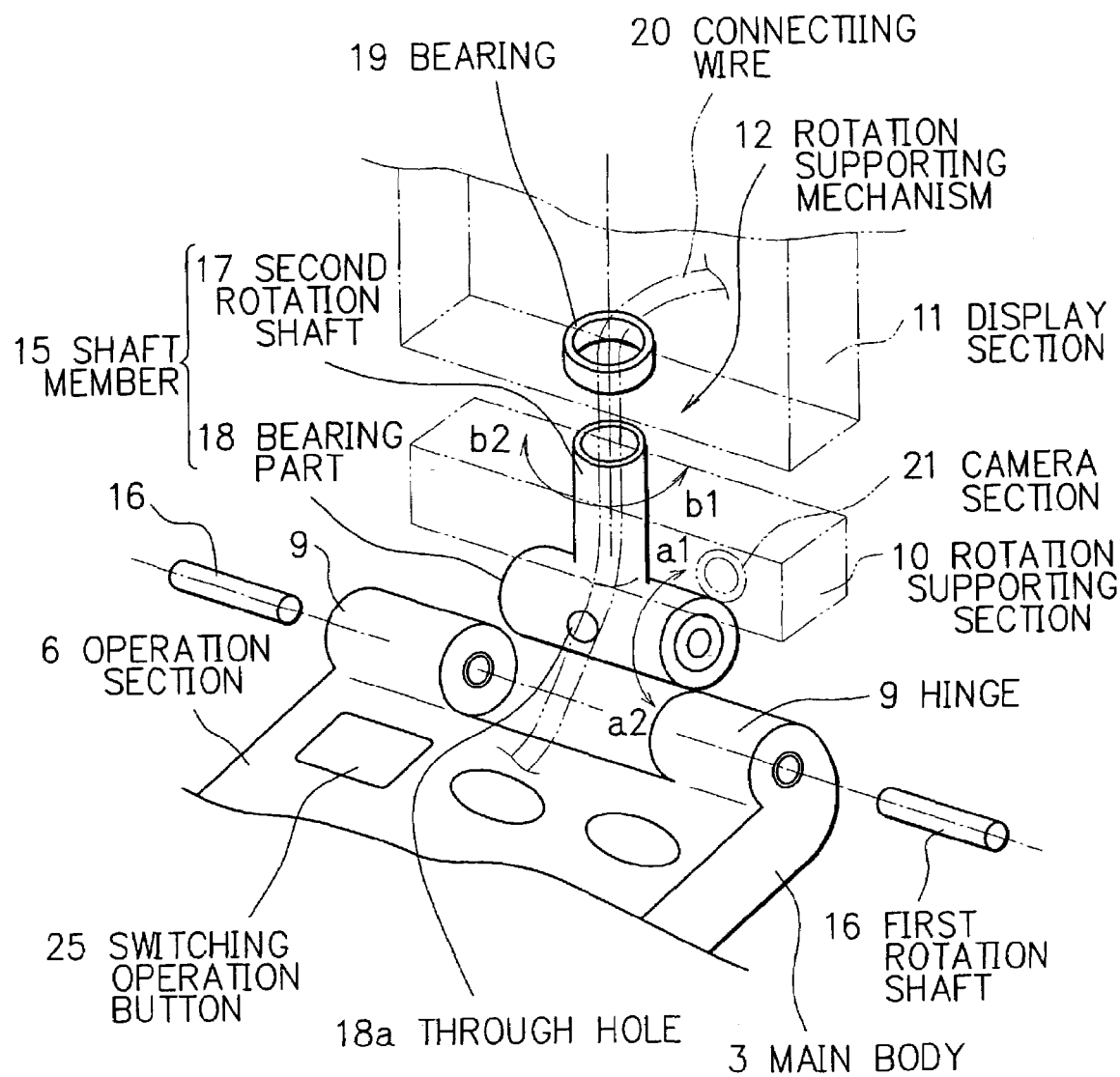
FIG. 3 is a diagram showing an exploded perspective view of a rotation supporting mechanism.

Referring to FIG. 3, the rotation supporting section 10 is provided with a rotation supporting mechanism 12 including a first rotation shaft 16, a shaft member 15, and a bearing 19. The first rotation shaft 16 joins the cover 4 with the hinge 9 so that the cover 4 is rotatable relative to the main body 3 in the directions indicated by arrows $a_1$ and $a_2$. The shaft member 15 includes a second rotation shaft 17 and a bearing part 18. The second rotation shaft 17 joins the display section 11 with the rotation supporting section 10 so that the display section 11 is rotatable relative to the main body 3 in the directions indicated by arrows $b_1$ and $b_2$. The second rotation shaft 17 is mounted in the bearing 19.

The first rotation shaft 16 is rotatably mounted in the hinge 9 of the main body 3 and the bearing part 18 of the shaft member 15. The second rotation shaft 17 is integrally formed with the bearing 18 in right-angle alignment with the axial direction of the bearing part 18. The shaft member 15 is hollow inside, and provided with a through hole 18a in the bearing part 18. The display section 11 is electrically connected to the control section of the main body 3 via a connecting wire 20 running from the through hole 18a through the second rotation shaft 17. The bearing 19 is fixedly set inside the display section 11. The second rotation shaft 17 is rotatably mounted in the bearing 19.

Additionally, the rotation supporting mechanism 12 further includes an engaging jutty part (not shown) around the outer perimeter of the second rotation shaft 17 and a lock member (not shown) that is engaged with the engaging jutty part to regulate rotation on the second rotation shaft 17. In the rotation supporting mechanism 12, the lock member is engaged with the engaging jutty part when the display section 11 is in a position rotated 180-degree on the second rotation shaft 17 so that the display section 11 is secured in the position with a prescribed holding power. By virtue of the rotation supporting mechanism 12 as described above, the display section 11 can be rotated 360-degree relative to the rotation supporting section 10 on the second rotation shaft 17.

Besides, the rotation supporting section 10 is provided with a camera section 21 having an objective lens 22 and a CCD (Charge Coupled Device) camera (not shown) electrically connected to the control section of the main body 3.

The objective lens 22 is arranged on the inner surface facing the operation section 6 of the main body 3 when the cellular telephone 1 is folded.

The display section 11 includes, for example, an LCD (Liquid Crystal Display) 23. The LCD 23 is arranged on the inner surface of the cover 4 so that its display surface is opposed to the operation section 6 on the main body 3.

The aforementioned rotation supporting mechanism 12 further includes a detection switch (not shown) around the outer perimeter of the second rotation shaft 17 for detecting the rotational position of the display section 11 with respect to the rotation supporting section 10. The detection switch is electrically connected to the control section of the main body 3. The control section automatically switches the display section 11 from the first display state to the second display state and vice versa based on the rotational position of the display section 11 detected by the detection switch. In the first display state, the display section 11 displays an image stored in a memory (not shown) of the cellular telephone 1 or a received image. In the second display state, the display section 11 serves as a monitor, and displays an image being taken by the camera section 21. More specifically, the control section switches the display state to the first display state when the display section 11 is rotated less than 180-degree relative to the rotation supporting section 10 on the second rotation shaft 17, and to the second display state when the display section 11 is rotated 180-degree or more relative to the rotation supporting section 10 on the second rotation shaft 17.

Incidentally, the operation section 6 of the main body 3 includes a switching operation button 25 for manually switching the display section 11 from the first display state to the second display state and vice versa. With the switching operation button 25, the display state can be arbitrary switched from both the first display state and the second display state. Consequently, it is possible to display an image being taken by the camera section 21 even when the display section 11 is not rotated relative to the main body 3 on the second rotation shaft 17. That is, a user can check an on-camera image by the display section 11 while taking a picture of his/her own face.

In addition, the cover 4 is provided with an earpiece 26 in a position adjacent to the LCD 23 of the display section 11. The earpiece 26 includes a speaker (nor shown) electrically connected to the control section of the main body 3.

Concerning the cellular telephone 1 as described previously in connection with FIGS. 2 and 3, a description will be given of rotational movements of the display section 11 on the first rotation shaft 16 and the second rotation shaft 17 with respect to the main body 3.

The cellular telephone 1 is folded when being carried around to prevent damage to the surface of the LCD 23 and wrong operation of the operation section 6.

When making a call or transmitting/receiving an image, text, etc., the cover 4 is rotated relative to the main body 3 on the first rotation shaft 16 so that the operation section 6 on the main body 3 can be manipulated and the display section 11 becomes viewable as shown in FIG. 2. At this point, the display section 11 is in the first display state. A user can view a stored or received image, etc., and also check an image such as a picture of his/her own face being taken by the camera section 21 by switching the display state to the second display state with the use of the switching operation button 25.

Figure 4:
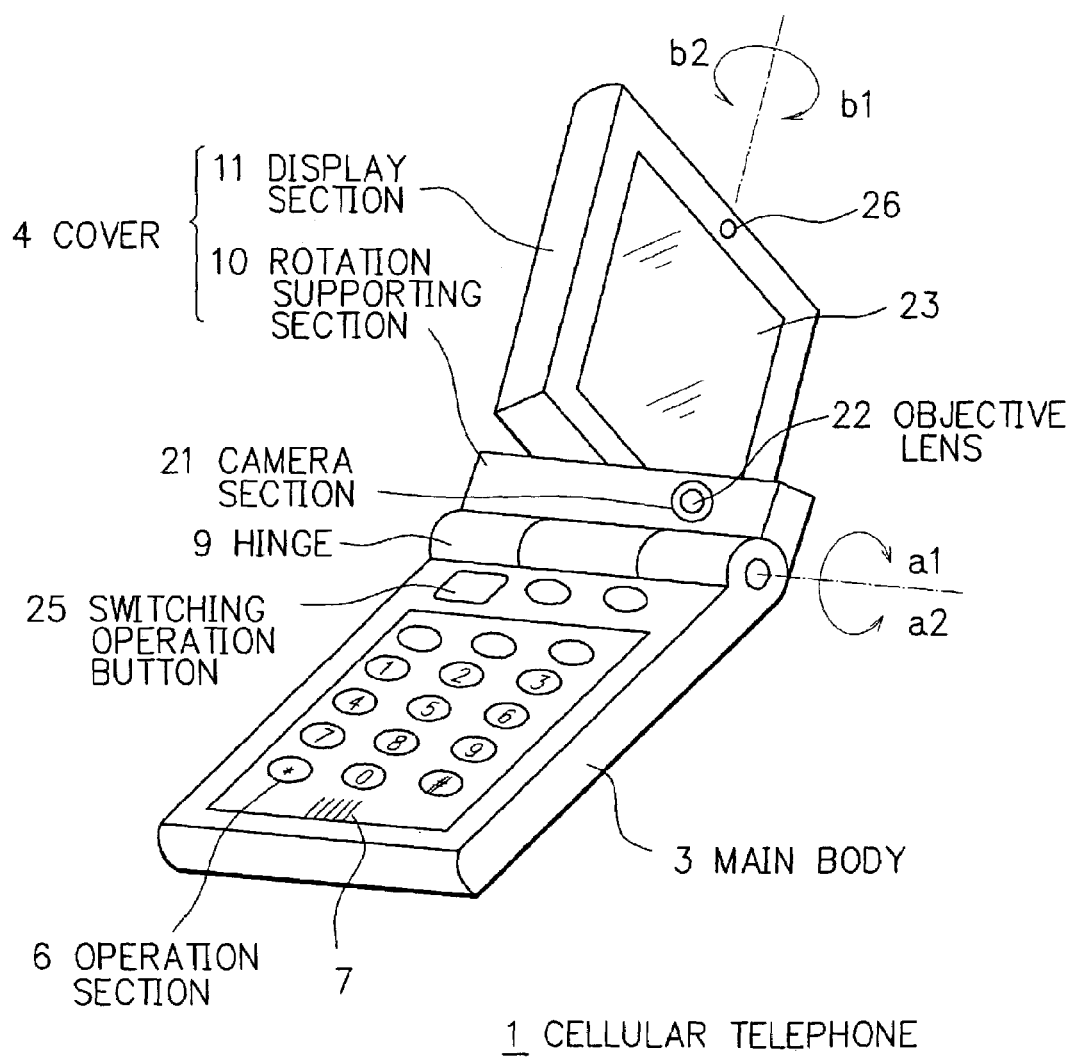
FIG. 4 is a diagram showing an oblique perspective view of the cellular telephone with a display section in a position rotated relative to a rotation supporting section.
Figure 5:
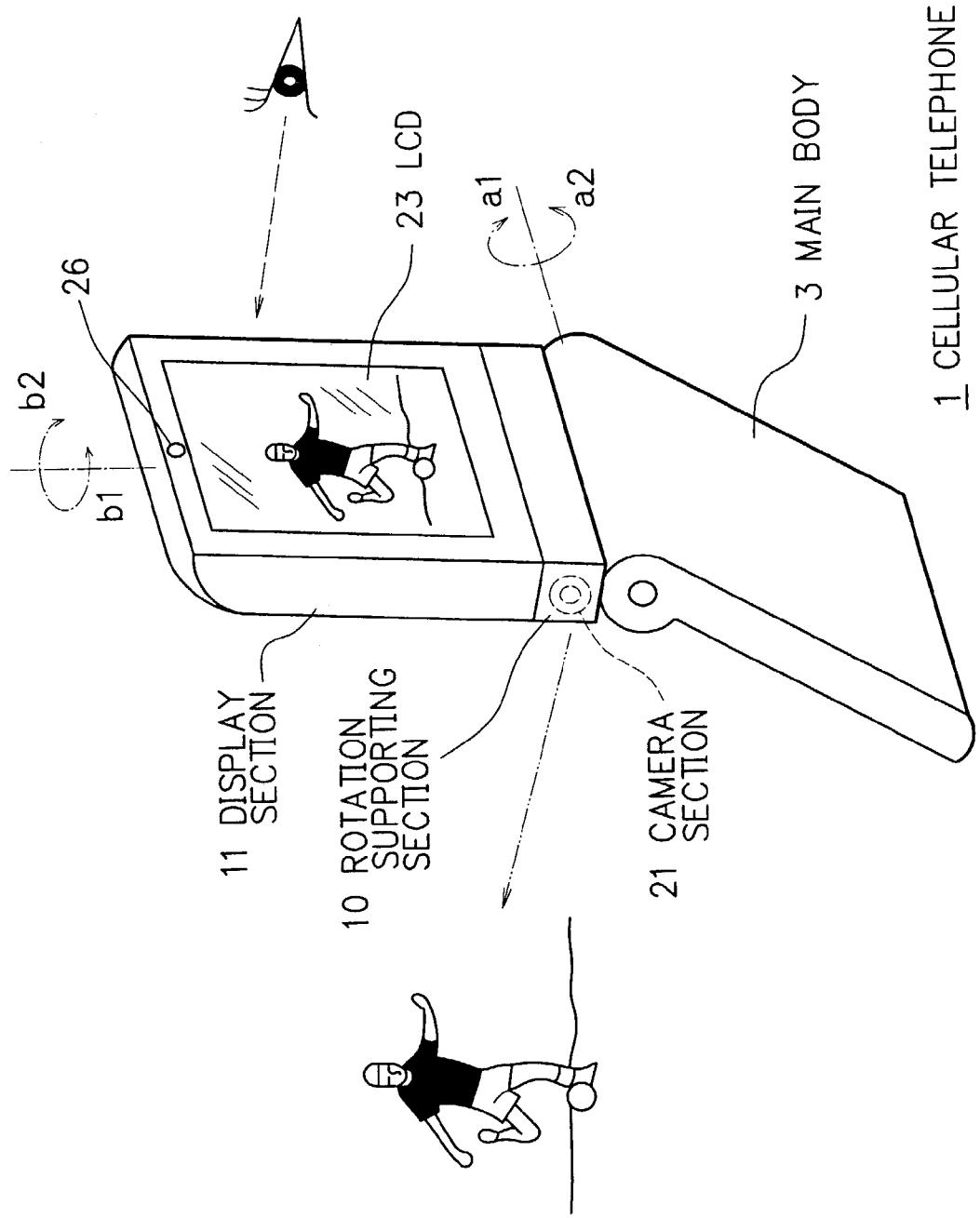
FIG. 5 is a diagram showing an oblique perspective view of the cellular telephone with the display section in a position rotated 180-degree relative to the rotation supporting section.

When rotated less than 180-degree relative to the rotation supporting section 10 on the second rotation shaft 17 as shown in FIG. 4, the display section 11 stays in the first display state. On the other hand, when rotated 180-degree or more as shown in FIG. 5, the display section 11 is automatically switched from the first display state to the second display state by the control section. Thereby, the user can check an image such as a picture of a landscape being taken by the camera section 21. Since the rotational movement of the display section 11 is regulated by the rotation supporting mechanism 12, the display section 11 is structurally secured in a position rotated 180-degree relative to the rotation supporting section 10.

Figure 6:
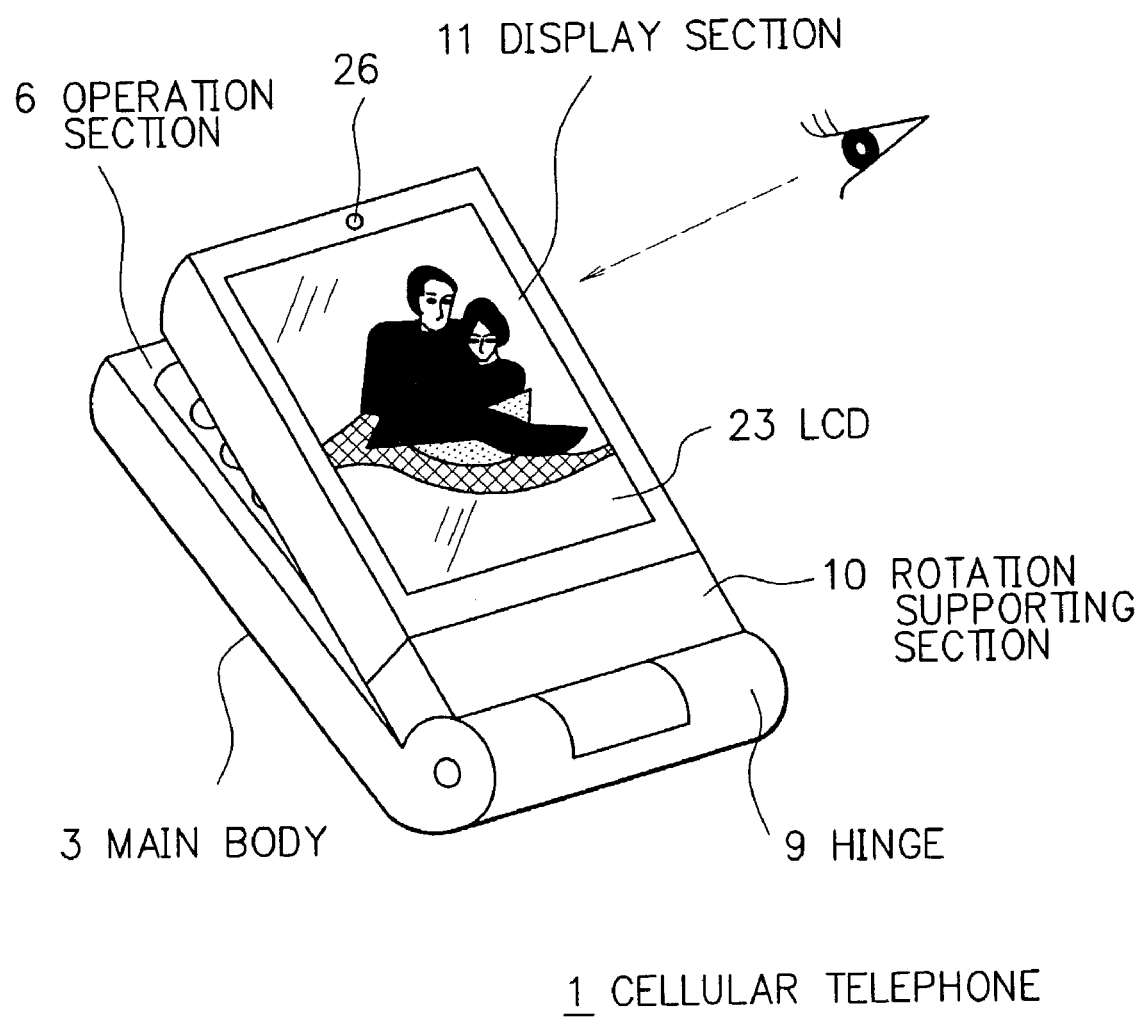
FIG. 6 is a diagram showing an oblique perspective view of the folded cellular telephone with the display section in a position rotated 180-degree relative to the rotation supporting section.

Besides, the cellular telephone 1 can be folded up and closed as shown in FIG. 6 by rotating the rotation supporting section 10 relative to the main body 3 on the first rotation shaft 16 with the display section 11 in a position rotated 180-degree relative to the rotation supporting section 10 on the second rotation shaft 17. In this condition, the display section 11 is automatically switched from the second display state to the first display state by the control section, and the user can view a received image or the like. Namely, the cellular telephone 1 allows the user to view received images or the like even when the main body 3 and the cover 4 are in their folded condition.

As described above, the cellular telephone 1 is provided with the display section which is rotatable relative to the main body 3 on the second rotation shaft 17. Consequently, the cellular telephone 1 allows a user to check an on-camera image displayed in the display section 11 while taking a picture of a landscape or the like, and ensures operationality of equality with general still cameras and camcorders. That is, the cellular telephone 1 is more easily operable for taking a picture of a landscape or the like. In addition, with the use of the cellular telephone 1, a user can take pictures of his/her own face as well as a landscape, etc. by only one camera section 21. Thus, the cellular telephone 1 maintains excellent portability, and the manufacturing cost can be reduced.

Moreover, by folding up the cellular telephone 1 with the display section 11 in a position rotated 180-degree relative to the rotation supporting section 10 on the second rotation shaft 17, a user can view a screen image currently displayed on the display section 11 even when the cellular telephone 1 is in its compact form.

Furthermore, the cellular telephone 1 is folded up when carried around so that the operation section 6, the display section 11 and the camera section 21 can be protected. Consequently, it is possible to prevent wrong operation of the operation keys and damages to the LCD 23 and the objective lens 22 reliably.

Incidentally, while the portable communication device of the present invention is used as a cellular telephone in this embodiment, it is obvious that the present invention is applicable to various types of portable electronic apparatuses such as PDA.

As set forth hereinabove, the portable communication device of the present invention is provided with a cover having a rotation supporting section and a display section. The rotation supporting section is supported for rotational movement relative to the main body on the first axis, and has an objective lens in a position facing the operation section on the main body when the device is folded up. The display section is supported for rotational movement relative to the rotation supporting section on the second axis running at right angles to the first axis. With this construction, it is possible to improve the operationality of the portable communication device for taking pictures of a landscape, etc. by the camera, and ensure excellent portability. Moreover, damage to the objective lens is reliably prevented when the portable communication device is folded up to carry around.

Besides, the portable communication device of the present invention allows a user to view images on camera and take pictures of his/her face as well as a landscape, etc. in good condition by only one camera. Consequently, it is possible to provide a small portable communication device with excellent portability at a low manufacturing cost.

Furthermore, the portable communication device of the present invention can be folded up with the display section in a position rotated 180-degree relative to the rotation supporting section on the second axis. Accordingly, a user can view the display section even when the portable communication device is folded up in a compact form. Thus, the portable communication device of the present invention ensures excellent portability even when using the display section.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. A portable communication device comprising: a main body which has an operation section including operation keys and buttons on its main surface; a cover which has a display section for showing information, and is joined to the main body so as to be foldable; and a camera having an objective lens; wherein:

the cover includes a rotation supporting section which is supported for rotational movement relative to the main body on a first axis, and a display section which is supported for rotational movement relative to the rotation supporting section on a second axis running at right angles to the first axis; and the rotation supporting section is provided with the objective lens in a position facing the operation section on the main body when the portable communication device is folded.

2. The portable communication device claimed in claim 1, further comprising a position regulation means for keeping the display section in a position rotated 180-degree relative to the rotation supporting section on the second axis.

3. A portable communication device comprising: a main body which has an operation section including operation keys and buttons on its main surface; a cover which has a display section for showing information, and is joined to the main body so as to be foldable; a camera having an objective lens; a microphone and an earpiece for transmitting/receiving a voice; wherein:

the cover includes a rotation supporting section which is supported for rotational movement relative to the main body on a first axis, and a display section which is supported for rotational movement relative to the rotation supporting section on a second axis running at right angles to the first axis; and the rotation supporting section is provided with the objective lens in a position facing the operation section on the main body when the portable communication device is folded.

4. The portable communication device claimed in claim 3, further comprising a position regulation means for keeping the display section in a position rotated 180-degree relative to the rotation supporting section on the second axis.

5. A portable communication device comprising: a main body which has an operation section including operation keys and buttons on its main surface; a cover which has a display section for showing information, and is joined to the main body so as to be foldable; and a camera having an objective lens; wherein:

the cover includes a rotation supporting section which is supported for rotational movement relative to the main body on a first axis, and a display section which is supported for rotational movement relative to the rotation supporting section on a second axis running at right angles to the first axis;

the rotation supporting section is provided with the objective lens in a position facing the operation section on the main body when the portable communication device is folded; and the display section is supported so as to be rotatable 360-degree relative to the rotation supporting section on the second axis.

6. The portable communication device claimed in claim 5, further comprising a position regulation means for keeping the display section in a position rotated 180-degree relative to the rotation supporting section on the second axis.

7. A portable communication device comprising: a main body which has an operation section including operation keys and buttons on its main surface; a cover which has a display section for showing information, and is joined to the main body so as to be foldable; a camera having an objective lens; a microphone and an earpiece for transmitting/receiving a voice; wherein:

the cover includes a rotation supporting section which is supported for rotational movement relative to the main body on a first axis, and a display section which is supported for rotational movement relative to the rotation supporting section on a second axis running at right angles to the first axis;

the rotation supporting section is provided with the objective lens in a position facing the operation section on the main body when the portable communication device is folded; and the display section is supported so as to be rotatable 360-degree relative to the rotation supporting section on the second axis.

8. The portable communication device claimed in claim 7, further comprising a position regulation means for keeping the display section in a position rotated 180-degree relative to the rotation supporting section on the second axis.

9. A portable communication device comprising: a main body which has an operation section including operation keys and buttons on its main surface; a cover which has a display section for showing information, and is joined to the main body so as to be foldable; a camera having an objective lens; and a control means for switching a display shown on the display section from the first display state in which an image stored in a memory is displayed to the second display state in which an image being taken through the objective lens is displayed; wherein:

the cover includes a rotation supporting section which is supported for rotational movement relative to the main body on a first axis, and a display section which is supported for rotational movement relative to the rotation supporting section on a second axis running at right angles to the first axis; and the rotation supporting section is provided with the objective lens in a position facing the operation section on the main body when the portable communication device is folded.

10. The portable communication device claimed in claim 9, wherein the operation section on the main body is provided with a switching operation button for switching the first display state and the second display state.

11. The portable communication device claimed in claim 9, wherein the control means brings the display section in the first display state when the portable communication device is folded with the display section being outwardly visible.

12. The portable communication device claimed in claim 9, wherein:
the operation section on the main body is provided with a switching operation button for switching the first display state and the second display state; and
the control means brings the display section in the first display state when the portable communication device is folded with the display section being outwardly visible.

13. The portable communication device claimed in claim 9, further comprising a position regulation means for keeping the display section in a position rotated 180-degree relative to the rotation supporting section on the second axis.

14. The portable communication device claimed in claim 9, further comprising a position regulation means for keeping the display section in a position rotated 180-degree relative to the rotation supporting section on the second axis, wherein the operation section on the main body is provided with a switching operation button for switching the first display state and the second display state.

15. The portable communication device claimed in claim 9, further comprising a position regulation means for keeping the display section in a position rotated 180-degree relative to the rotation supporting section on the second axis, wherein the control means brings the display section in the first display state when the portable communication device is folded with the display section being outwardly visible.

16. The portable communication device claimed in claim 9, further comprising a position regulation means for keeping the display section in a position rotated 180-degree relative to the rotation supporting section on the second axis, wherein:
the operation section on the main body is provided with a switching operation button for switching the first display state and the second display state; and
the control means brings the display section in the first display state when the portable communication device is folded with the display section being outwardly visible.

17. A portable communication device comprising: a main body which has an operation section including operation keys and buttons on its main surface; a cover which has a display section for showing information, and is joined to the main body so as to be foldable; a camera having an objective lens; a microphone and an earpiece for transmitting/receiving a voice; and a control means for switching a display shown on the display section from the first display state in which an image stored in a memory is displayed to the second display state in which an image being taken through the objective lens is displayed; wherein:
the cover includes a rotation supporting section which is supported for rotational movement relative to the main body on a first axis, and a display section which is supported for rotational movement relative to the rotation supporting section on a second axis running at right angles to the first axis; and
the rotation supporting section is provided with the objective lens in a position facing the operation section on the main body when the portable communication device is folded.

18. The portable communication device claimed in claim 17, wherein the operation section on the main body is provided with a switching operation button for switching the first display state and the second display state.

19. The portable communication device claimed in claim 17, wherein the control means brings the display section in the first display state when the portable communication device is folded with the display section being outwardly visible.

20. The portable communication device claimed in claim 17, wherein:
the operation section on the main body is provided with a switching operation button for switching the first display state and the second display state; and
the control means brings the display section in the first display state when the portable communication device is folded with the display section being outwardly visible.

21. The portable communication device claimed in claim 17, further comprising a position regulation means for keeping the display section in a position rotated 180-degree relative to the rotation supporting section on the second axis.

22. The portable communication device claimed in claim 17, further comprising a position regulation means for keeping the display section in a position rotated 180-degree relative to the rotation supporting section on the second axis, wherein the operation section on the main body is provided with a switching operation button for switching the first display state and the second display state.

23. The portable communication device claimed in claim 17, further comprising a position regulation means for keeping the display section in a position rotated 180-degree relative to the rotation supporting section on the second axis, wherein the control means brings the display section in the first display state when the portable communication device is folded with the display section being outwardly visible.

24. The portable communication device claimed in claim 17, further comprising a position regulation means for keeping the display section in a position rotated 180-degree relative to the rotation supporting section on the second axis, wherein:
the operation section on the main body is provided with a switching operation button for switching the first display state and the second display state; and
the control means brings the display section in the first display state when the portable communication device is folded with the display section being outwardly visible.

25. A portable communication device comprising: a main body which has an operation section including operation keys and buttons on its main surface; a cover which has a display section for showing information, and is joined to the main body so as to be foldable; a camera having an objective lens; and a control means for switching a display shown on the display section from the first display state in which an image stored in a memory is displayed to the second display state in which an image being taken through the objective lens is displayed; wherein:
the cover includes a rotation supporting section which is supported for rotational movement relative to the main body on a first axis, and a display section which is supported for rotational movement relative to the rotation supporting section on a second axis running at right angles to the first axis;

the rotation supporting section is provided with the objective lens in a position facing the operation section on the main body when the portable communication device is folded; and the display section is supported so as to be rotatable 360-degree relative to the rotation supporting section on the second axis.

26. The portable communication device claimed in claim 25, wherein the operation section on the main body is provided with a switching operation button for switching the first display state and the second display state.

27. The portable communication device claimed in claim 25, wherein the control means brings the display section in the first display state when the portable communication device is folded with the display section being outwardly visible.

28. The portable communication device claimed in claim 25, wherein:
the operation section on the main body is provided with a switching operation button for switching the first display state and the second display state; and
the control means brings the display section in the first display state when the portable communication device is folded with the display section being outwardly visible.

29. The portable communication device claimed in claim 25, further comprising a position regulation means for keeping the display section in a position rotated 180-degree relative to the rotation supporting section on the second axis.

30. The portable communication device claimed in claim 25, further comprising a position regulation means for keeping the display section in a position rotated 180-degree relative to the rotation supporting section on the second axis, wherein the operation section on the main body is provided with a switching operation button for switching the first display state and the second display state.

31. The portable communication device claimed in claim 25, further comprising a position regulation means for keeping the display section in a position rotated 180-degree relative to the rotation supporting section on the second axis, wherein the control means brings the display section in the first display state when the portable communication device is folded with the display section being outwardly visible.

32. The portable communication device claimed in claim 25, further comprising a position regulation means for keeping the display section in a position rotated 180-degree relative to the rotation supporting section on the second axis, wherein:
the operation section on the main body is provided with a switching operation button for switching the first display state and the second display state; and
the control means brings the display section in the first display state when the portable communication device is folded with the display section being outwardly visible.

33. A portable communication device comprising: a main body which has an operation section including operation keys and buttons on its main surface; a cover which has a display section for showing information, and is joined to the main body so as to be foldable; a camera having an objective lens; a microphone and an earpiece for transmitting/receiving a voice; and a control means for switching a display shown on the display section from the first display state in which an image stored in a memory is displayed to the second display state in which an image being taken through the objective lens is displayed; wherein:

the cover includes a rotation supporting section which is supported for rotational movement relative to the main body on a first axis, and a display section which is supported for rotational movement relative to the rotation supporting section on a second axis running at right angles to the first axis;

the rotation supporting section is provided with the objective lens in a position facing the operation section on the main body when the portable communication device is folded; and the display section is supported so as to be rotatable 360-degree relative to the rotation supporting section on the second axis.

34. The portable communication device claimed in claim 33, wherein the operation section on the main body is provided with a switching operation button for switching the first display state and the second display state.

35. The portable communication device claimed in claim 33, wherein the control means brings the display section in the first display state when the portable communication device is folded with the display section being outwardly visible.

36. The portable communication device claimed in claim 33, wherein:
the operation section on the main body is provided with a switching operation button for switching the first display state and the second display state; and
the control means brings the display section in the first display state when the portable communication device is folded with the display section being outwardly visible.

37. The portable communication device claimed in claim 33, further comprising a position regulation means for keeping the display section in a position rotated 180-degree relative to the rotation supporting section on the second axis.

38. The portable communication device claimed in claim 33, further comprising a position regulation means for keeping the display section in a position rotated 180-degree relative to the rotation supporting section on the second axis, wherein the operation section on the main body is provided with a switching operation button for switching the first display state and the second display state.

39. The portable communication device claimed in claim 33, further comprising a position regulation means for keeping the display section in a position rotated 180-degree relative to the rotation supporting section on the second axis, wherein the control means brings the display section in the first display state when the portable communication device is folded with the display section being outwardly visible.

40. The portable communication device claimed in claim 33, further comprising a position regulation means for keeping the display section in a position rotated 180-degree relative to the rotation supporting section on the second axis, wherein:
the operation section on the main body is provided with a switching operation button for switching the first display state and the second display state; and
the control means brings the display section in the first display state when the portable communication device is folded with the display section being outwardly visible.

41. A portable communication device comprising: a main body which has an operation section including operation keys and buttons on its main surface; a cover which has a display section for showing information, and is joined to the main body so as to be foldable; a camera having an objective lens; and a control means for switching a display shown on the display section from the first display state in which an image stored in a memory is displayed to the second display state in which an image being taken through the objective lens is displayed; wherein:

the cover includes a rotation supporting section which is supported for rotational movement relative to the main body on a first axis, and a display section which is supported for rotational movement relative to the rotation supporting section on a second axis running at right angles to the first axis;

the rotation supporting section is provided with the objective lens in a position facing the operation section on the main body when the portable communication device is folded; and the control means switches a display shown on the display section from the first display state to the second display state when the display section is rotated 180-degree relative to the rotation supporting section on the second axis.

42. The portable communication device claimed in claim 41, wherein the operation section on the main body is provided with a switching operation button for switching the first display state and the second display state.

43. The portable communication device claimed in claim 41, wherein the control means brings the display section in the first display state when the portable communication device is folded with the display section being outwardly visible.

44. The portable communication device claimed in claim 41, wherein:

the operation section on the main body is provided with a switching operation button for switching the first display state and the second display state; and the control means brings the display section in the first display state when the portable communication device is folded with the display section being outwardly visible.

45. The portable communication device claimed in claim 41, further comprising a position regulation means for keeping the display section in a position rotated 180-degree relative to the rotation supporting section on the second axis.

46. The portable communication device claimed in claim 41, further comprising a position regulation means for keeping the display section in a position rotated 180-degree relative to the rotation supporting section on the second axis, wherein the operation section on the main body is provided with a switching operation button for switching the first display state and the second display state.

47. The portable communication device claimed in claim 41, further comprising a position regulation means for keeping the display section in a position rotated 180-degree relative to the rotation supporting section on the second axis, wherein the control means brings the display section in the first display state when the portable communication device is folded with the display section being outwardly visible.

48. The portable communication device claimed in claim 41, further comprising a position regulation means for keeping the display section in a position rotated 180-degree relative to the rotation supporting section on the second axis, wherein:

the operation section on the main body is provided with a switching operation button for switching the first display state and the second display state; and the control means brings the display section in the first display state when the portable communication device is folded with the display section being outwardly visible.

49. A portable communication device comprising: a main body which has an operation section including operation keys and buttons on its main surface; a cover which has a display section for showing information, and is joined to the main body so as to be foldable; a camera having an objective lens; a microphone and an earpiece for transmitting/receiving a voice; and a control means for switching a display shown on the display section from the first display state in which an image stored in a memory is displayed to the second display state in which an image being taken through the objective lens is displayed; wherein:

the cover includes a rotation supporting section which is supported for rotational movement relative to the main body on a first axis, and a display section which is supported for rotational movement relative to the rotation supporting section on a second axis running at right angles to the first axis;

the rotation supporting section is provided with the objective lens in a position facing the operation section on the main body when the portable communication device is folded; and the control means switches a display shown on the display section from the first display state to the second display state when the display section is rotated 180-degree relative to the rotation supporting section on the second axis.

50. The portable communication device claimed in claim 49, wherein the operation section on the main body is provided with a switching operation button for switching the first display state and the second display state.

51. The portable communication device claimed in claim 49, wherein the control means brings the display section in the first display state when the portable communication device is folded with the display section being outwardly visible.

52. The portable communication device claimed in claim 49, wherein:

the operation section on the main body is provided with a switching operation button for switching the first display state and the second display state; and the control means brings the display section in the first display state when the portable communication device is folded with the display section being outwardly visible.

53. The portable communication device claimed in claim 49, further comprising a position regulation means for keeping the display section in a position rotated 180-degree relative to the rotation supporting section on the second axis.

54. The portable communication device claimed in claim 49, further comprising a position regulation means for keeping the display section in a position rotated 180-degree relative to the rotation supporting section on the second axis, wherein the operation section on the main body is provided with a switching operation button for switching the first display state and the second display state.

55. The portable communication device claimed in claim 49, further comprising a position regulation means for keeping the display section in a position rotated 180-degree relative to the rotation supporting section on the second axis, wherein the control means brings the display section in the first display state when the portable communication device is folded with the display section being outwardly visible.

56. The portable communication device claimed in claim 49, further comprising a position regulation means for keeping the display section in a position rotated 180-degree relative to the rotation supporting section on the second axis, wherein:

the operation section on the main body is provided with a switching operation button for switching the first display state and the second display state; and the control means brings the display section in the first display state when the portable communication device is folded with the display section being outwardly visible.

57. A portable communication device comprising: a main body which has an operation section including operation keys and buttons on its main surface; a cover which has a display section for showing information, and is joined to the main body so as to be foldable; a camera having an objective lens; and a control means for switching a display shown on the display section from the first display state in which an image stored in a memory is displayed to the second display state in which an image being taken through the objective lens is displayed; wherein:

the cover includes a rotation supporting section which is supported for rotational movement relative to the main body on a first axis, and a display section which is supported for rotational movement relative to the rotation supporting section on a second axis running at right angles to the first axis;

the rotation supporting section is provided with the objective lens in a position facing the operation section on the main body when the portable communication device is folded;

the display section is supported so as to be rotatable 360-degree relative to the rotation supporting section on the second axis; and the control means switches a display shown on the display section from the first display state to the second display state when the display section is rotated 180-degree relative to the rotation supporting section on the second axis.

58. The portable communication device claimed in claim 57, wherein the operation section on the main body is provided with a switching operation button for switching the first display state and the second display state.

59. The portable communication device claimed in claim 57, wherein the control means brings the display section in the first display state when the portable communication device is folded with the display section being outwardly visible.

60. The portable communication device claimed in claim 57, wherein:

the operation section on the main body is provided with a switching operation button for switching the first display state and the second display state; and the control means brings the display section in the first display state when the portable communication device is folded with the display section being outwardly visible.

61. The portable communication device claimed in claim 57, further comprising a position regulation means for keeping the display section in a position rotated 180-degree relative to the rotation supporting section on the second axis.

62. The portable communication device claimed in claim 57, further comprising a position regulation means for keeping the display section in a position rotated 180-degree relative to the rotation supporting section on the second axis, wherein the operation section on the main body is provided with a switching operation button for switching the first display state and the second display state.

63. The portable communication device claimed in claim 57, further comprising a position regulation means for keeping the display section in a position rotated 180-degree relative to the rotation supporting section on the second axis, wherein the control means brings the display section in the first display state when the portable communication device is folded with the display section being outwardly visible.

64. The portable communication device claimed in claim 57, further comprising a position regulation means for keeping the display section in a position rotated 180-degree relative to the rotation supporting section on the second axis, wherein:

the operation section on the main body is provided with a switching operation button for switching the first display state and the second display state; and the control means brings the display section in the first display state when the portable communication device is folded with the display section being outwardly visible.

65. A portable communication device comprising: a main body which has an operation section including operation keys and buttons on its main surface; a cover which has a display section for showing information, and is joined to the main body so as to be foldable; a camera having an objective lens; a microphone and an earpiece for transmitting/receiving a voice; and a control means for switching a display shown on the display section from the first display state in which an image stored in a memory is displayed to the second display state in which an image being taken through the objective lens is displayed; wherein:

the cover includes a rotation supporting section which is supported for rotational movement relative to the main body on a first axis, and a display section which is supported for rotational movement relative to the rotation supporting section on a second axis running at right angles to the first axis;

the rotation supporting section is provided with the objective lens in a position facing the operation section on the main body when the portable communication device is folded;

the display section is supported so as to be rotatable 360-degree relative to the rotation supporting section on the second axis; and the control means switches a display shown on the display section from the first display state to the second display state when the display section is rotated 180-degree relative to the rotation supporting section on the second axis.

66. The portable communication device claimed in claim 65, wherein the operation section on the main body is provided with a switching operation button for switching the first display state and the second display state.

67. The portable communication device claimed in claim 65, wherein the control means brings the display section in the first display state when the portable communication device is folded with the display section being outwardly visible.

68. The portable communication device claimed in claim 65, wherein:

the operation section on the main body is provided with a switching operation button for switching the first display state and the second display state; and the control means brings the display section in the first display state when the portable communication device is folded with the display section being outwardly visible.

69. The portable communication device claimed in claim 65, further comprising a position regulation means for keeping the display section in a position rotated 180-degree relative to the rotation supporting section on the second axis.

70. The portable communication device claimed in claim 65, further comprising a position regulation means for keeping the display section in a position rotated 180-degree relative to the rotation supporting section on the second axis, wherein the operation section on the main body is provided with a switching operation button for switching the first display state and the second display state.

71. The portable communication device claimed in claim 65, further comprising a position regulation means for keeping the display section in a position rotated 180-degree relative to the rotation supporting section on the second axis, wherein the control means brings the display section in the first display state when the portable communication device is folded with the display section being outwardly visible.

72. The portable communication device claimed in claim 65, further comprising a position regulation means for keeping the display section in a position rotated 180-degree relative to the rotation supporting section on the second axis, wherein:
  the operation section on the main body is provided with a switching operation button for switching the first display state and the second display state; and
  the control means brings the display section in the first display state when the portable communication device is folded with the display section being outwardly visible.

* * * * *